(12) United States Patent
Garth et al.

(10) Patent No.: US 7,970,046 B2
(45) Date of Patent: Jun. 28, 2011

(54) BLOCK TIME DOMAIN EQUALIZER FOR TIME REVERSAL-SPACE TIME BLOCK CODE SYSTEM AND METHOD FOR ENCODING AND EQUALIZING RECEIVED SIGNAL IN THE BLOCK TIME DOMAIN EQUALIZER

(75) Inventors: Lee M. Garth, Christchurch (NZ); Abdulla Firag, Christchurch (NZ); Eung Sun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 868 days.

(21) Appl. No.: 11/851,406

(22) Filed: Sep. 7, 2007

(65) Prior Publication Data

US 2008/0080613 A1  Apr. 3, 2008

(30) Foreign Application Priority Data

Sep. 28, 2006 (KR) .................. 10-2006-0094887

(51) Int. Cl.
*H03K 5/159* (2006.01)
*H03H 7/30* (2006.01)
*H03H 7/40* (2006.01)

(52) U.S. Cl. ......... 375/229; 375/232; 375/233; 375/316

(58) Field of Classification Search .................. 375/229, 375/232, 233, 316
See application file for complete search history.

(56) References Cited

U.S. PATENT DOCUMENTS

| 7,190,734 B2 * | 3/2007 | Giannakis et al. ............. 375/267 |
| 7,471,734 B2 * | 12/2008 | Thomas et al. ............... 375/295 |
| 2002/0076777 A1 | 6/2002 | Merkulov et al. |
| 2002/0181430 A1 | 12/2002 | Thomas et al. |
| 2004/0013180 A1 * | 1/2004 | Giannakis et al. ............ 375/219 |
| 2005/0254590 A1 | 11/2005 | Kukkula et al. |
| 2006/0182193 A1 | 8/2006 | Monsen |

FOREIGN PATENT DOCUMENTS

| KR | 10-2001-0079740 A | 8/2001 |
| KR | 10-2002-0071861 A | 9/2002 |
| KR | 10-2005-0081226 A | 8/2005 |
| KR | 1020050117436 A | 12/2005 |
| KR | 1020060065059 A | 6/2006 |
| KR | 1020070085494 A | 8/2007 |

OTHER PUBLICATIONS

Andre Lima F. De Almeida, "Decoupled Approach for Space-Time Processing with Applications to Joint Detection and MIMO Systems", pp. 1-49, Sep. 15, 2006. Mari Kobayashi, et al. "A Low-Complexity Approach to Space-Time Coding for Multipath Fading Channels", Journal on Wireless Communications and Networking 2005:3, 437-446.

(Continued)

*Primary Examiner* — Ted M Wang
(74) *Attorney, Agent, or Firm* — Sughrue Mion, PLLC

(57) ABSTRACT

Provided is a block Time Domain Equalizer (TDE) for a Time Reversal-Space Time Block Codes (TR-STBC) system. The block TDE comprises a block equalizer which generates an output based on an equalizer tap weight with respect to two consecutively received blocks, an equalizer tap weight updating unit which generates an error vector based on the output and the equalizer tap weight and updates the equalizer tap weight using the error vector, and a signal processing unit which processes the output into a digital signal wherein zero padding is eliminated from the output.

20 Claims, 13 Drawing Sheets

OTHER PUBLICATIONS

Jun Yang, et al. "A Training Sequence Based Transmit Diversity Technique for Frequency Selective Fading Channels", Center for Advanced Communications, Villanova University, Villanova, PA. 19085, pp. 66-69, 2003.

A. L. F. de Alemida, et al. "Performance of MIMO Systems with a Hybrid of Transmit Diversity and Spatial Multiplexing", Fortaleza, Brazil, 2003.

Stefan Geirhofer, et al. "Time-Reversal Space Coding for Doubly-Selective Channels," in Proc. IEEE WCNC, Apr. 2006 (6 pages).

W.C. Freitas Jr., et al. "Interference Cancellation Receiver for Space-Time Block-Coded Systems over Frequency Channels," World Wireless Congress (WWC), San Francisco, USA, May 2003 (6 pages).

Dino Flore and Erik Lindskog, "Time Reversal Space-Time Block Coding vs. Transmit Delay Diversity—A Comparison Based on GSM-like System," 2000 (pp. 1-5).

* cited by examiner

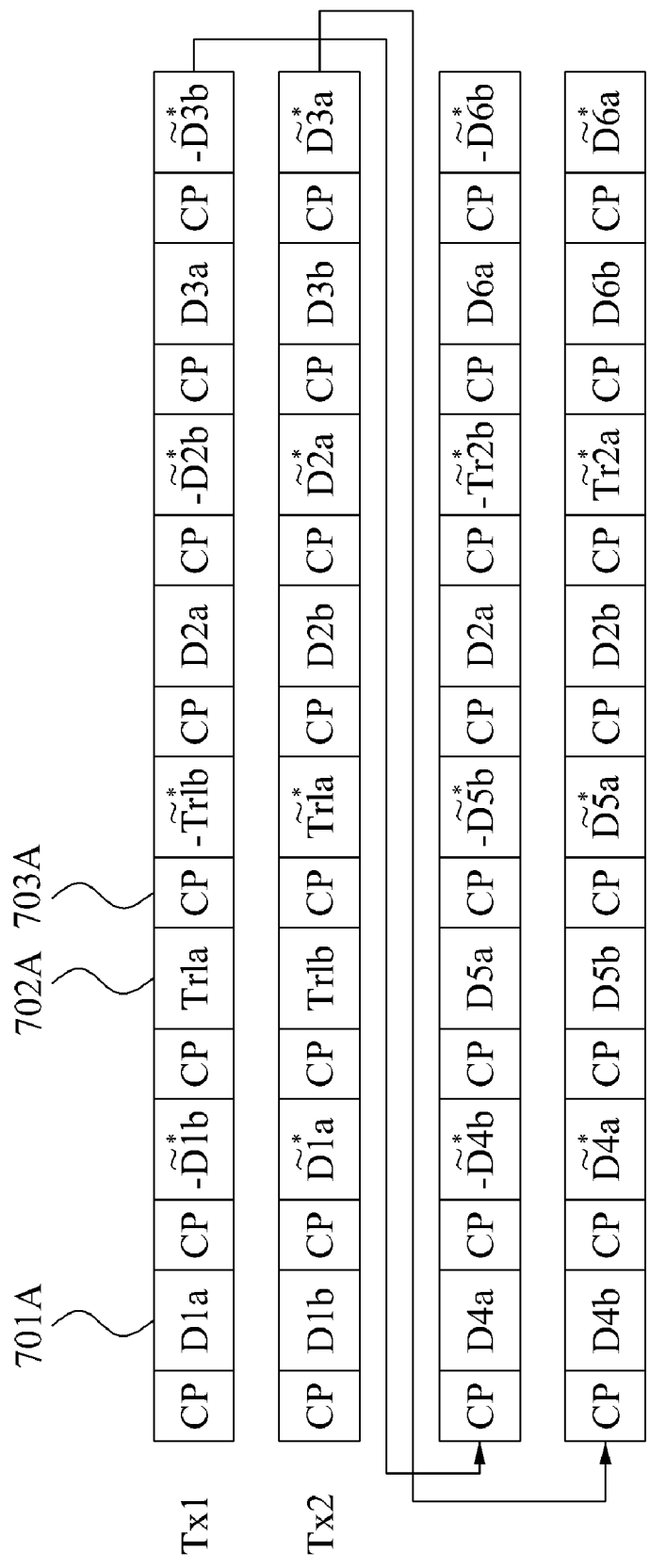

BLOCK TIME DOMAIN EQUALIZER FOR TIME REVERSAL-SPACE TIME BLOCK CODE SYSTEM AND METHOD FOR ENCODING AND EQUALIZING RECEIVED SIGNAL IN THE BLOCK TIME DOMAIN EQUALIZER

CROSS-REFERENCE TO RELATED APPLICATION

This application claims the benefit of Korean Patent Application No. 10-2006-0094887, filed on Sep. 28, 2006, in the Korean Intellectual Property Office, the entire disclosure of which is incorporated herein by reference.

BACKGROUND OF THE INVENTION

1. Field of the Invention

Methods and apparatuses consistent with the present invention relate to a block Time Domain Equalizer (TDE) for a Time Reversal-Space Time Block Code (TR-STBC) system, and encoding and equalizing a received signal in the block TDE. More particularly, methods and apparatuses consistent with the present invention relate to the block TDE which has a tap length independent of a data block length and includes training and data blocks in the same block by using a block equalizer where a decoder and an equalizer are combined, so that it can be used in fast time-varying channels, and encoding and equalizing a received signal in the block TDE.

2. Description of Related Art

In the last decade, a huge growth in wireless technologies like cellular telephony, personal/portable devices and the mobile Internet has been seen. The fundamental phenomenon which makes reliable wireless transmission difficult is time-varying multipath fading of the wireless channel. However, recent research has proven that spatial diversity techniques are effective at mitigating this multipath fading.

A Time Reversal-Space Time Block Coding (TR-STBC) scheme in which the spatial diversity technique is adopted combines time-domain filtering, conjugation, and time-reversal operations. Outputs of the TR-STBC decoder are decoupled but contain residual Inter-Symbol Interference (ISI) which must be mitigated using equalizers. FIG. 1 illustrates a structure of a conventional TR-STBC system. As illustrated in FIG. 1, a TR-STBC encoder 101 transmits signals to a TR-STBC decoder 103 from two antennas 102 for the spatial diversity, and the TR-STBC decoder 103 receives, decodes, and then equalizes the transmitted signals using an equalizer 104, thereby obtaining outputs.

Unfortunately, to perform this equalization, the optimal maximum likelihood sequence estimation techniques have exponentially increasing complexity with the signal constellation size and Channel Impulse Response (CIR) length.

Conventional block STBC structures for frequency selective fading channels which have been attempted to solve the above-mentioned problem require explicit knowledge of the CIR with respect to the decoding and equalization of the STBC transmissions. FIG. 2 illustrates a structure of a conventional TR-STBC system in which a block Frequency Domain Equalizer (FDE) is adapted. The TR-STBC encoder 201 transmits signals to a block FDE 202 from two antennas for spatial diversity, and the block FDE 202 decodes and equalizes the transmitted signals. In the TR-STBC system using the block FDE 202 processed in a frequency domain, the CIR is estimated using training sequences or pilot tones embedded in the transmission. Then, the optimum decoder/equalizer settings are computed based on this estimated CIR.

However, as a combined decoder/adaptive equalizer scheme is based on frequency domain block equalization, the equalizer is constrained to have the same length as the data block length. Since combining the training block and the data block within the same block is difficult, there is difficulty in using a conventional TR-STBC system in the fast time-varying channel.

SUMMARY OF THE INVENTION

It is an aspect of the present invention to provide a block Time Domain Equalizer (TDE) for a Time Reversal-Space Time Block Code (TR-STBC) system in which the block TDE which combines a decoder and an equalizer, thereby reducing the computational complexity, and facilitating the driving in real-time.

Another aspect of the present invention provides a block TDE for a TR-STBC system in which a decoder/equalizer length is independent of the block length, thereby reducing the computational complexity, and in which the training and data blocks are included in the same block through flexibility in use of different length training and data blocks.

Still another aspect of the present invention provides a block TDE for a TR-STBC system in which a new frame structure where the training and data blocks are mixed in the same block is used, thereby increasing efficiency in channels having high mobility.

According to an aspect of the present invention, there is provided a block TDE for a TR-STBC system, comprising a block equalizer which generates an output based on an equalizer tap weight with respect to two consecutively received blocks; an equalizer tap weight updating unit which generates an error vector based on the output and the equalizer tap weight and updates the equalizer tap weight using the error vector; and a signal processing unit which processes the output into a digital signal wherein zero padding is eliminated from the output.

In this instance, the equalizer tap weight is $w_k$, and includes $w_1$ and $w_2$, which are respectively represented as $$\tilde{w}^*_1 = \text{conv}(w, h_1), \quad \text{[Equation 1]}$$

where w denotes an element of an equalizer matrix W, and $h_1$ denotes one of Channel Impulse Responses (CIRs) of two channels fixed in the consecutive received blocks; and $$w_2 = \text{conv}(w, h_2), \quad \text{[Equation 2]}$$

where $h_2$ denotes another one of the CIRs of the two channels.

Also, the equalizer tap weight has a characteristic in that values before and after applying computation for time-reversal and complex conjugate are identical to each other, in which the complex conjugate is given by $$w_o = \tilde{w}^*_o, \text{ and} \quad \text{[Equation 3]}$$

the block equalizer generates the output by $$\begin{bmatrix} \hat{x}_1^{(k)} \\ \hat{x}_2^{*(k)} \end{bmatrix} = \begin{bmatrix} Y^{(k)} & \tilde{Y}^{*(k+1)} \\ -Y^{(k+1)} & \tilde{Y}^{*(k)} \end{bmatrix} \begin{bmatrix} w_1 \\ w_2 \end{bmatrix} \triangleq Uw_k, \quad \text{[Equation 4]}$$

where each of $\hat{x}_1^{(k)}$ and $\tilde{x}^*_2{}^{(k)}$ denotes the outputs, and U is generated based on the received block.

According to another aspect of the present invention, there is provided a frame structure used in the block TDE, in which a symbol block including a training block and a data block with different lengths is mixed with at least one TR-STBC block included in the frame.

BRIEF DESCRIPTION OF THE DRAWINGS

The above and other aspects of the present invention will become apparent and more readily appreciated from the following detailed description of certain exemplary embodiments of the invention, taken in conjunction with the accompanying drawings of which:

FIGS. 7A and 7B respectively illustrate a conventional frame structure and a frame structure according to another exemplary embodiment of the present invention;

DETAILED DESCRIPTION OF EXEMPLARY EMBODIMENTS

Figure 1:
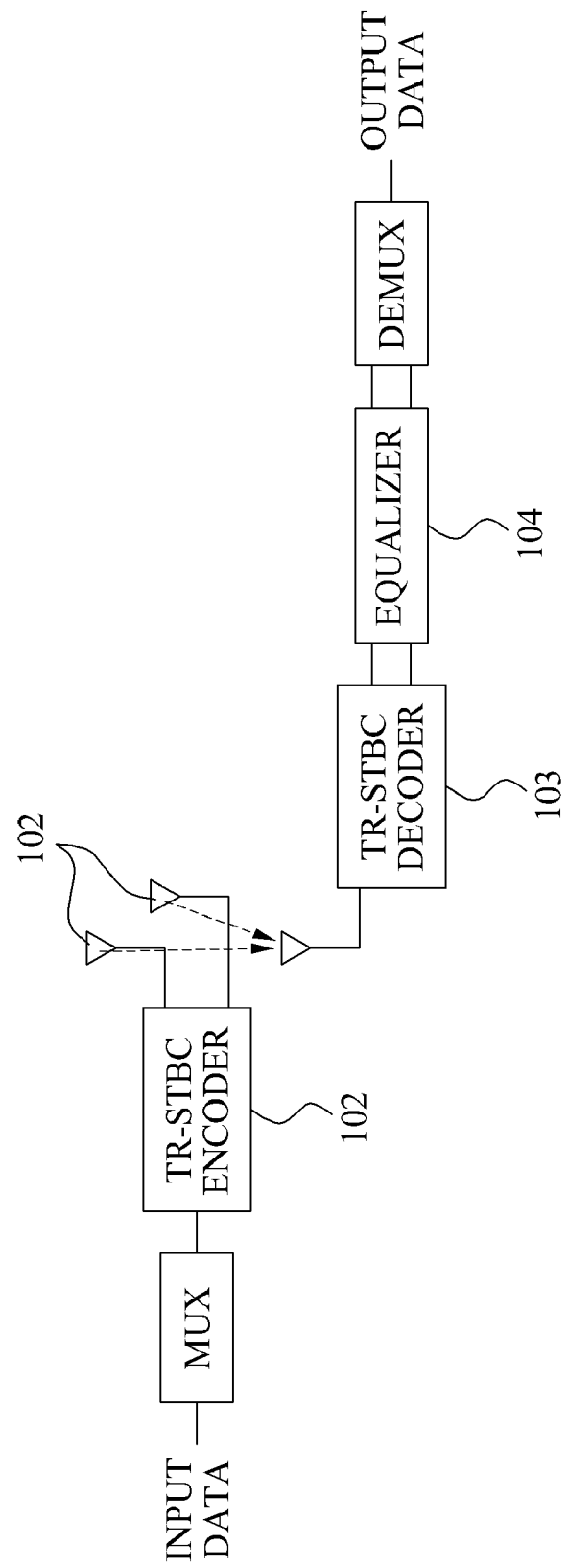
FIG. 1 illustrates a structure of a conventional Time Reversal-Space Time Block Coding (TR-STBC) system.
Figure 2:
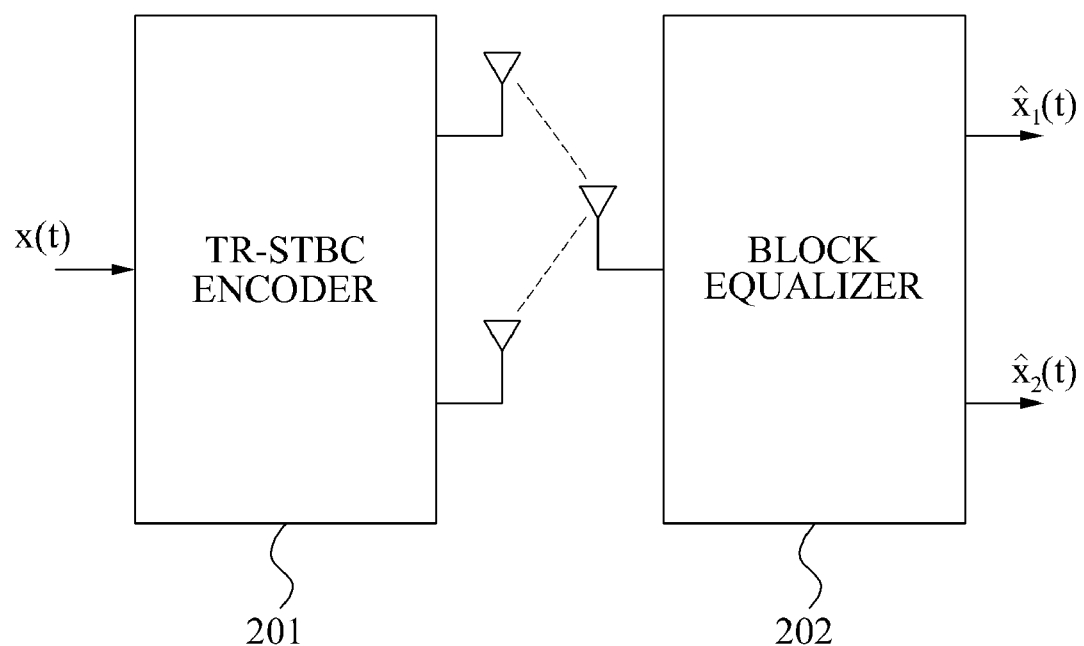
FIG. 2 illustrates a structure of a conventional TR-STBC system in which a block Frequency Domain Equalizer (FDE) is adapted.

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

I. Background

1. Time Reversal-Space Time Block Code (TR-STBC)

Figure 3:
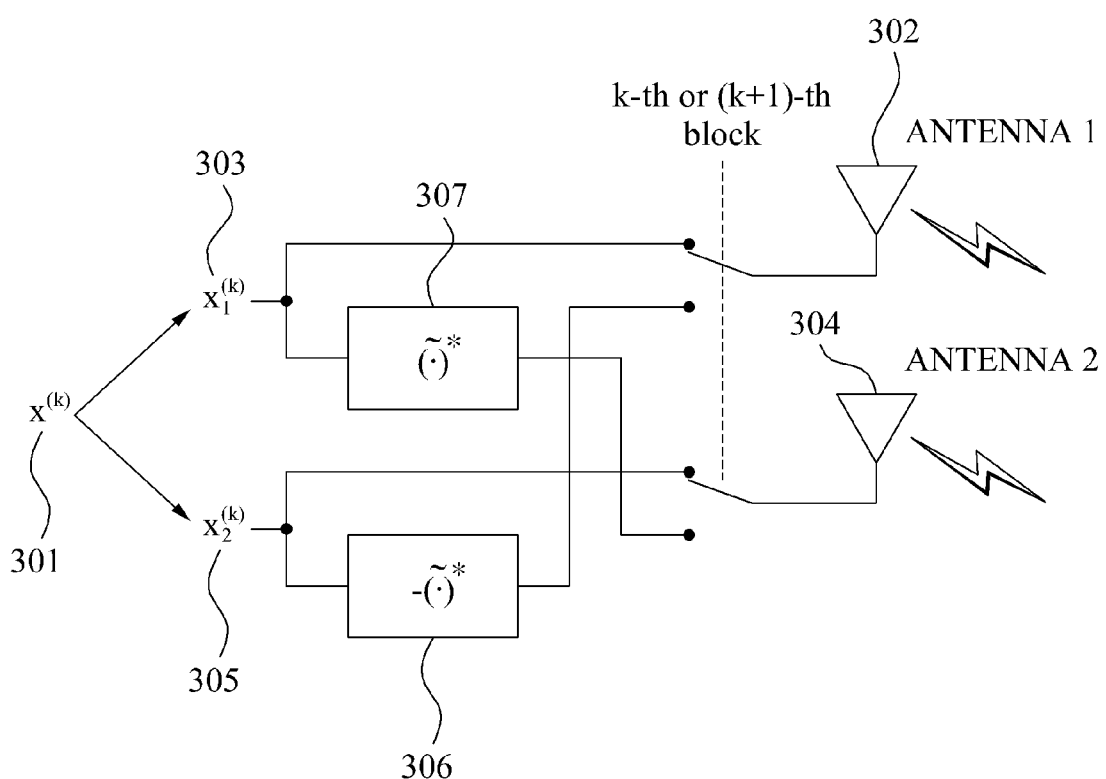
FIG. 3 illustrates a process where a conventional TR-STBC system encodes a data block and transmits the encoded data block from an antenna.

FIG. 3 illustrates a process where a conventional TR-STBC system encodes a data block and transmits the encoded data block from an antenna.

In the TR-STBC system, data symbols are transmitted from antennas in blocks of length N to a receiver. During a k-th block interval 301, where k is even, a first antenna 302 transmits a symbol block 303 to the receiver. The symbol block 303 is represented as $$x_1^{(k)} = [x_1^{(k)}(0), \ldots, x_1^{(k)}(N-1)]^T. \quad \text{[Equation 5]}$$

Also, a second antenna 304 transmits a symbol block 305 to the receiver. The symbol block 305 is represented as $$x_2^{(k)} = [x_2^{(k)}(0), \ldots, x_2^{(k)}(N-1)]^T. \quad \text{[Equation 6]}$$

During the k+1-th block interval, the symbol block 305 is time reversed, which is given by Equation 7. Specifically, a sequence of vector elements represented as Equation 6 is changed. The symbol block 305 is complex conjugated and negated as indicated by reference segment 306, and thereby transmitted to the receiver from the first antenna 302.

$$x_1^{(k+1)} = -\tilde{x}_2^{*(k)} = [-x_2^{*(k)}(N-1), \ldots, -x_2^{*(k)}(0)]^T. \quad \text{[Equation 7]}$$

Also, during the k+1-th block interval, the symbol block 303 is time reversed and complex conjugated as indicated by reference segment 307, which is given by Equation 8, and thereby transmitted to the receiver from the second antenna 304.

$$x_2^{(k+1)} = \tilde{x}_1^{*(k)} = [x_1^{*(k)}(N-1), \ldots, x_1^{*(k)}(0)]^T. \quad \text{[Equation 8]}$$

After each data block, zero-padding consisting of V zero symbols is inserted to overcome the inter-block interference, where V is the memory of the channel. Then, the received blocks are given by $$y^{(k)} = [y^{(k)}(0), \ldots, y^{(k)}(N+V-1)]^T$$

$$y^{(k+1)} = [y^{(k+1)}(0), \ldots, y^{(k+1)}(N+V-1)]^T. \quad \text{[Equation 9]}$$

Also, additive white noises are given by $$y^{(k)} = H_1^{(k)} x_1^{(k)} + H_2^{(k)} x_2^{(k)} + n^{(k)}$$

$$y^{(k+1)} = H_1^{(k)} x_1^{(k+1)} + H_2^{(k)} x_2^{(k+1)} + n^{(k+1)}, \quad \text{[Equation 10]}$$

where $n^{(k)}$ and $n^{(k+1)}$ are noise vectors with covariance matrix $\sigma_n^2 I_{(N+V)}$, and $H_1^{(k)}$ and $H_2^{(k)}$ are the channel convolution matrices of channel 1 and 2, respectively. Also, matrix $H_i^{(k)}$ has a dimension of (N+V)×N, which is given by $$H_i^{(k)} = \begin{bmatrix} h_i^{(k)} & 0 & \ldots & 0 \\ 0 & h_i^{(k)} & \ldots & 0 \\ \vdots & \vdots & \ddots & \vdots \\ 0 & 0 & \ldots & h_i^{(k)} \end{bmatrix}, \quad \text{[Equation 11]}$$

where $h_i^{(k)} = [h_i^{(k)}(0), h_i^{(k)}(1), \ldots, h_i^{(k)}(V)]^T$ is the i-th Channel Impulse Responses (CIR) sequence.

Here, Equation 12 is obtained by using the same encoding rules as encoding rules applied in Equation 7 and Equation 8, which is given by $$y = \begin{bmatrix} y^{(k)} \\ \tilde{y}^{*(k+1)} \end{bmatrix} = Hx + n \quad \text{[Equation 12]}$$

$$= \begin{bmatrix} H_1^{(k)} & H_2^{(k)} \\ \tilde{H}_2^{*(k)} & -\tilde{H}_1^{*(k)} \end{bmatrix} \begin{bmatrix} x_1^{(k)} \\ x_2^{(k)} \end{bmatrix} + \begin{bmatrix} n^{(k)} \\ \tilde{n}^{*(k+1)} \end{bmatrix},$$

where matrix $\tilde{H}_i^{*(k)}$ has the same form as Equation 11 with $\tilde{h}_i^{*(k)}$ replaced by $h_i^{(k)}$. Matrix H has the property that the transmitted blocks $x_1^{(k)}$ and $x_2^{(k)}$ become decoupled by Equation 13 which is given by $$H_d = \begin{bmatrix} \tilde{H}_{1d}^{*(k)} & H_{2d}^{(k)} \\ \tilde{H}_{2d}^{*(k)} & -H_{1d}^{(k)} \end{bmatrix},$$ [Equation 13]

where matrices $H_{id}^{(k)}$ and $\tilde{H}*_{id}^{(k)}$ have the same form as Equation 11, but with dimensions of $(N+2V)\times(N+V)$. Thus, the resulting output from the TR-STBC decoder is represented as $$z = \begin{bmatrix} z_1^{(k)} \\ z_2^{(k)} \end{bmatrix} = H_d y$$ [Equation 14]

$$= \begin{bmatrix} G^{(k)} & 0 \\ 0 & G^{(k)} \end{bmatrix} \begin{bmatrix} x_1^{(k)} \\ x_2^{(k)} \end{bmatrix} + H_d \begin{bmatrix} n^{(k)} \\ \tilde{n}^{*(k+1)} \end{bmatrix},$$

where $G^{(k)}$ is represented as $$G^{(k)} = \tilde{H}_{1d}^{*(k)} H_1^{(k)} + H_{2d}^{(k)} \tilde{H}_2^{*(k)}$$ [Equation 15]
$$= \tilde{H}_{2d}^{*(k)} H_2^{(k)} + H_{1d}^{(k)} \tilde{H}_1^{*(k)}.$$

2. Minimum-Mean-Square-Error (MMSE) Equalizer

As described above, the decoupled outputs from the equalizer are given by $$z_1 = Gx_1 + \tilde{H}*_{1d} n + H_{2d} \tilde{n}^*$$

$$z_2 = Gx_2 + \tilde{H}*_{2d} n - H_{1d} \tilde{n}^*,$$ [Equation 16]

where the (k) and (k+1) superscripts are dropped from the notation. The decoupled signals generated by Equation 16 have equal channel gain matrices and can show that the noise statistics are the same. Therefore, the same MMSE tap weights can be applied to both blocks $z_1$ and $z_2$ to remove Inter-Symbol Interference (ISI). Therefore, we now only consider a block of one decoder's outputs, that is, $z_1 = [z_1(0), \ldots, z_1(N+2V-1)]^T$, when deriving the MMSE solution for the equalizer taps.

We assume that the q-tap equalizer is symbol spaced with tap weight vector w. Also, we assume that q is an odd integer. The output of the block equalizer is written $\hat{x}_1 = Z_1 w$, where $Z_1$ has a dimension of $(N+2V+q-1)\times q$ and is given by $$Z_1 = \begin{bmatrix} z_1 & 0 & \cdots & 0 \\ 0 & z_1 & \cdots & 0 \\ \vdots & \vdots & \ddots & \vdots \\ 0 & 0 & \cdots & z_1 \end{bmatrix}.$$ [Equation 17]

The estimation error at the output of the equalizer is represented as $$e_1 = x_{1ext} - Z_1 w$$

$$x_{1ext} = [0_{1\times[(2V+q-1)/2]}, x_1^T, 0_{1\times[(2V+q-1)/2]}]^T,$$ [Equation 18]

where the tap weight vector w for minimizing the Mean-Square-Error (MSE) is obtained by Equation 19, and gradient w* of the tap weight vector w is further obtained. Also, the optimum MMSE equalizer tap weight vector is yielded by Equation 20. Equation 19 and Equation 20 are respectively represented as $$J(w) = E\{\|x_{1ext} - Z_1 w\|^2\},$$ [Equation 19]

$$w_o = [E\{Z_1^H Z_1\}]^{-1} E\{Z_1^H x_{1ext}\},$$ [Equation 20]

where an autocorrelation matrix $E\{Z_1^H Z_1\}$ having a dimension of $(q\times q)$ is represented as $$E\{Z_1^H Z_1\} = \begin{bmatrix} Tr_0(R_z) & Tr_1(R_z) & \cdots & Tr_{(q-1)}(R_z) \\ Tr_{-1}(R_z) & Tr_0(R_z) & \cdots & Tr_{(q-2)}(R_z) \\ \vdots & \vdots & \ddots & \vdots \\ Tr_{-(q-1)}(R_z) & Tr_{-(q-2)}(R_z) & \cdots & Tr_0(R_z) \end{bmatrix},$$ [Equation 21]

where $R_z$ is given by $E\{z_1 z_1^H\} = \sigma_x^2 G G^H + \sigma_n^2 \tilde{H}*_{1d} \tilde{H}*_{1d}^H + \sigma_n^2 H_{2d} H_{2d}^H$ and denotes the autocorrelation matrix of $z_1$, and $Tr_k(R_z)$ denotes the k-th off-diagonal trace of matrix $R_z$. Similarly, if we define q-dimensional cross-correlation vector $$p \stackrel{\Delta}{=} E\{Z_1^H x_{1ext}\},$$

we can show that its k-th row can be written $$p(k, 1) = Tr_0\{[G(\max(1, V+1+p-k): \ldots \min(N+2V, V+N+p-k), \ldots \\ \max(1, 1-V-p+k): \ldots \min(N, N+V-p+k))]^H\},$$ [Equation 22]

where $p=(q+1)/2$ and the optimum MMSE equalizer tap weights can be obtained by substituting Equation 21 and Equation 22 into Equation 20.

Figure 4:
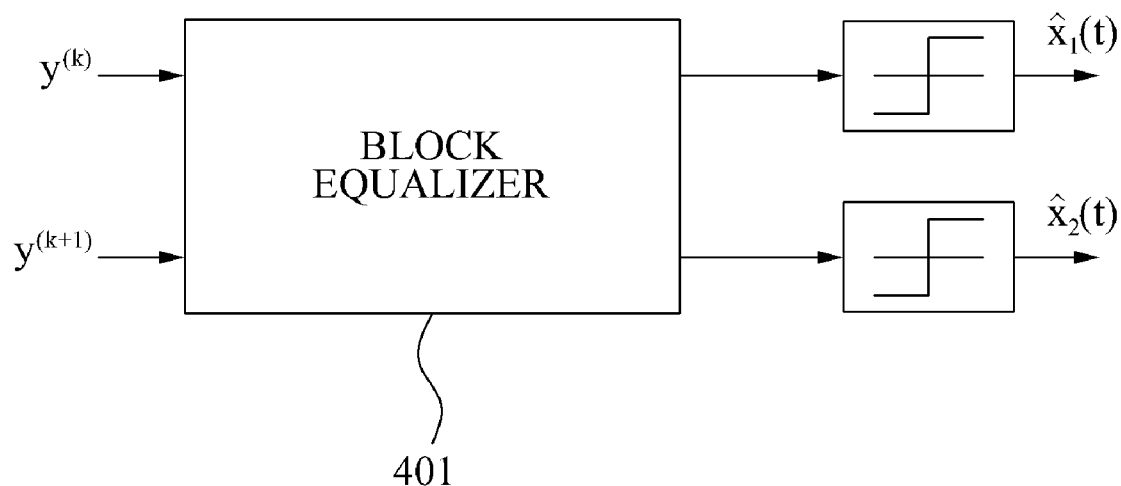
FIG. 4 is a schematic view of a TR-STBC receiver in which a decoder and an equalizer are combined according to an exemplary embodiment of the present invention.

II. Block Time Domain Equalizer (TDE) According to an Exemplary Embodiment of the Present Invention FIG. 4 is a schematic view of a TR-STBC receiver in which a decoder and an equalizer are combined according to an exemplary embodiment of the present invention. As illustrated in FIG. 4, in a TR-STBC receiver 400, a block equalizer 401 in which a decoder and an equalizer are combined is shown. Here, two output streams are generated with respect to an input.

Using the property that the tap weight vector $w_o$ is the same for both outputs $z_1$ and $z_2$ from equation 12 through 14, the equalizer outputs for the two streams $\hat{x}_1$ and $\hat{x}_2$ are represented as $$\begin{bmatrix} \hat{x}_1 \\ \hat{x}_2 \end{bmatrix} = \begin{bmatrix} W & 0 \\ 0 & W \end{bmatrix} \begin{bmatrix} z_1 \\ z_2 \end{bmatrix}$$ [Equation 23]

$$= \begin{bmatrix} W\tilde{H}_{1d}^{*(k)} & WH_{2d}^{(k)} \\ W\tilde{H}_{2d}^{*(k)} & -WH_{1d}^{(k)} \end{bmatrix} \begin{bmatrix} y^{(k)} \\ \tilde{y}^{*(k+1)} \end{bmatrix},$$

where equalizer matrix W has a dimension of $(N+2V+q-1)\times(N+2V)$, which is given by $$W = \begin{bmatrix} w & 0 & \cdots & 0 \\ 0 & w & \cdots & 0 \\ \vdots & \vdots & \ddots & \vdots \\ 0 & 0 & \cdots & w \end{bmatrix}. \quad \text{[Equation 24]}$$

Also, the optimal tap weight vector $w_o$ generated by Equation 23 and Equation 24 has the conjugate time-reversal symmetry property, as given by Equation 3.

Enforcing this property on the TDE, Equation 23 can be rewrited as $$\begin{bmatrix} \hat{x}_1 \\ \hat{x}_2 \end{bmatrix} = \begin{bmatrix} \tilde{W}^* \tilde{H}^*_{1d} & WH_{2d} \\ \tilde{W}^* \tilde{H}^*_{2d} & -WH_{1d} \end{bmatrix} \begin{bmatrix} y^{(k)} \\ \tilde{y}^{*(k+1)} \end{bmatrix} \quad \text{[Equation 25]}$$

$$\triangleq \begin{bmatrix} \tilde{A}^*_1 & A_2 \\ \tilde{A}^*_2 & -A_1 \end{bmatrix} \begin{bmatrix} y^{(k)} \\ \tilde{y}^{*(k+1)} \end{bmatrix},$$

where joint equalizer-channel matrices $A_1 = W H_{1d}$ and $A_2 = W H_{2d}$. When time reversing and conjugating $\hat{x}_2$, and substituting for $\hat{x}_2$ of Equation 25, Equation 26 is obtained and given by $$\begin{bmatrix} \hat{x}_1 \\ \tilde{\hat{x}}_2 \end{bmatrix} = \begin{bmatrix} \tilde{A}^*_1 y^{(k)} + A_2 \tilde{y}^{*(k+1)} \\ A_2 \tilde{y}^{*(k)} - \tilde{A}^*_1 y^{(k+1)} \end{bmatrix}. \quad \text{[Equation 26]}$$

Here, when Equation 1 and Equation 2 having a tap weight of length $q_a = q+V$ are respectively applied with respect to the block equalizer, that is, the combined equalizer and decoder, Equation 27 is obtained with respect to an output of the output equalizer, which is given by $$\begin{bmatrix} \hat{x}_1^{(k)} \\ \tilde{\hat{x}}_2^{*(k)} \end{bmatrix} = \begin{bmatrix} Y^{(k)} & \tilde{Y}^{*(k+1)} \\ -Y^{(k+1)} & \tilde{Y}^{*(k)} \end{bmatrix} \begin{bmatrix} w_1 \\ w_2 \end{bmatrix} \triangleq Uw_k, \quad \text{[Equation 27]}$$

where matrix $Y^{(i)}$ of Equation 27 is represented as Equation 28 which has a dimension of $(N+2V+q-1)\times(q+V)$ and is given by $$Y^{(i)} = \begin{bmatrix} y^{(i)} & 0 & \cdots & 0 \\ 0 & y^{(i)} & \cdots & 0 \\ \vdots & \vdots & \ddots & \vdots \\ 0 & 0 & \cdots & y^{(i)} \end{bmatrix}, \quad \text{[Equation 28]}$$

where $Y^{(k)}$ may be a k-th matrix formed by the same method as a method of calculating matrix $Y^{(i)}$ with respect to the i-th received block in Equation 28, and $y^{(i)}$ may be an i-th received block formed by the same method as a method of calculating k-th and k+1-th received blocks which are consecutively received in Equation 10. Also, $\tilde{Y}^{*(i)}$ is formed by replacing $y^{(i)}$ by $\tilde{y}^{*(i)}$ in Equation 28.

Here, since the equalizer tap weights $w_k$ are isolated in Equation 27, the equalizer tap weights $w_k$ are easily adapted by using block versions of the Normalized Least Mean Square (NLMS) and Recursive Least Square (RLS) algorithms. First, an error vector is generated based on the output of the block equalizer and the equalizer tap weights. Next, the equalizer tap weight is updated using the error vector. Here, the error vector $e_k$ may be generated by comparing the outputs $\hat{x}_1^{(k)}$ and $\tilde{\hat{x}}^*_2{}^{(k)}$ and desired responses $x_{1ext}^{(k)}$ and $\tilde{x}^*_{2ext}{}^{(k)}$, which is given by $$e_k = \begin{bmatrix} x_{1ext}^{(k)} \\ \tilde{x}_{2ext}^{*(k)} \end{bmatrix} - \begin{bmatrix} \hat{x}_1^{(k)} \\ \tilde{\hat{x}}_2^{*(k)} \end{bmatrix}. \quad \text{[Equation 29]}$$

Also, the desired responses are generated by $$x_{1ext}^{(k)} = [0_{1\times[(2V+q-1)/2]}, (x_1^{(k)})^T, 0_{1\times[(2V+q-1)/2]}]^T$$

$$\tilde{x}^*_{2ext}{}^{(k)} = [0_{1\times[(2V+q-1)/2]}, (\tilde{x}^*_2{}^{(k)})^T, 0_{1\times[(2V+q-1)/2]}]^T. \quad \text{[Equation 30]}$$

The block NLMS and RLS algorithms are summarized in Table 1 and 2 as methods of updating the tap weight vector based on the error vector.

TABLE 1

Block NLMS Algorithm

Initial conditions:
$w_0 = 0_{2q_a \times 1}$
$P_0 = 0_{2q_a \times 2q_a}$
where $\mu$ is small positive
Update taps at each iteration using:
$P_k(m,m) = \mu/|U(m,:)|^2$, for $m = 1, \ldots, 2q_a$
$w_{k+2} = w_k + P_k U^T e_k^*$

TABLE 2

Block RLS Algorithm

Initial conditions:
$w_0 = 0_{2q_a \times 1}$
$\Phi_0 = I_{2q_a \times 2q_a}$
where $\lambda$ is small positive close to 1
Update taps at each iteration using:
$\Phi_{k+2} = \lambda \Phi_k + U^H U$
$w_{k+2} = w_k + \Phi_k^{-1} U^T e_k^*$ First, Table 1 illustrates the block NLMS algorithm. As illustrated in Table 1, in the block TDE, an initial condition with respect to the equalizer tap weights depicted in Equation 1 is given by $$w_0 = 0_{2q_a \times 1}$$

$$P_0 = 0_{2q_a \times 2q_a}. \quad \text{[Equation 31]}$$

Also, the equalizer tap weight is repeatedly updated according to the received block by using Equation 32 given by $$P_k(m,m) = \mu/|U(m,:)|^2, \text{ for } m=1, \ldots, 2q_a$$

$$w_{k+2} = w_k + P_k U^T e^*_k \quad \text{[Equation 32]}$$

Specifically, the block TDE initializes the equalizer tap weight for the block NLMS algorithm, and generates an error vector for the block equalizer included in the block TDE, thereby updates the equalizer tap weight based on the error vector, the equalizer tap weight, and the block equalizer output. Also, the block TDE generates the error vector at every received block and thereby repeatedly updates the equalizer tap weight.

Table 2 illustrates the block RLS algorithm. As illustrated in Table 2, in the block TDE, an initial condition with respect to the equalizer tap weights depicted in Equation 2 is given by $$w_0 = 0_{2q_a \times 1}$$

$$\Phi_0 = I_{2q_a \times 2q_a}.$$  [Equation 33]

Also, the equalizer tap weight is repeatedly updated according to the received block by using Equation 34 given by $$\Phi_{k+2} = \lambda \Phi_k + U^H U$$

$$w_{k+2} = w_k + \Phi_k^{-1} U^T e^*_k$$  [Equation 34]

Figure 5:
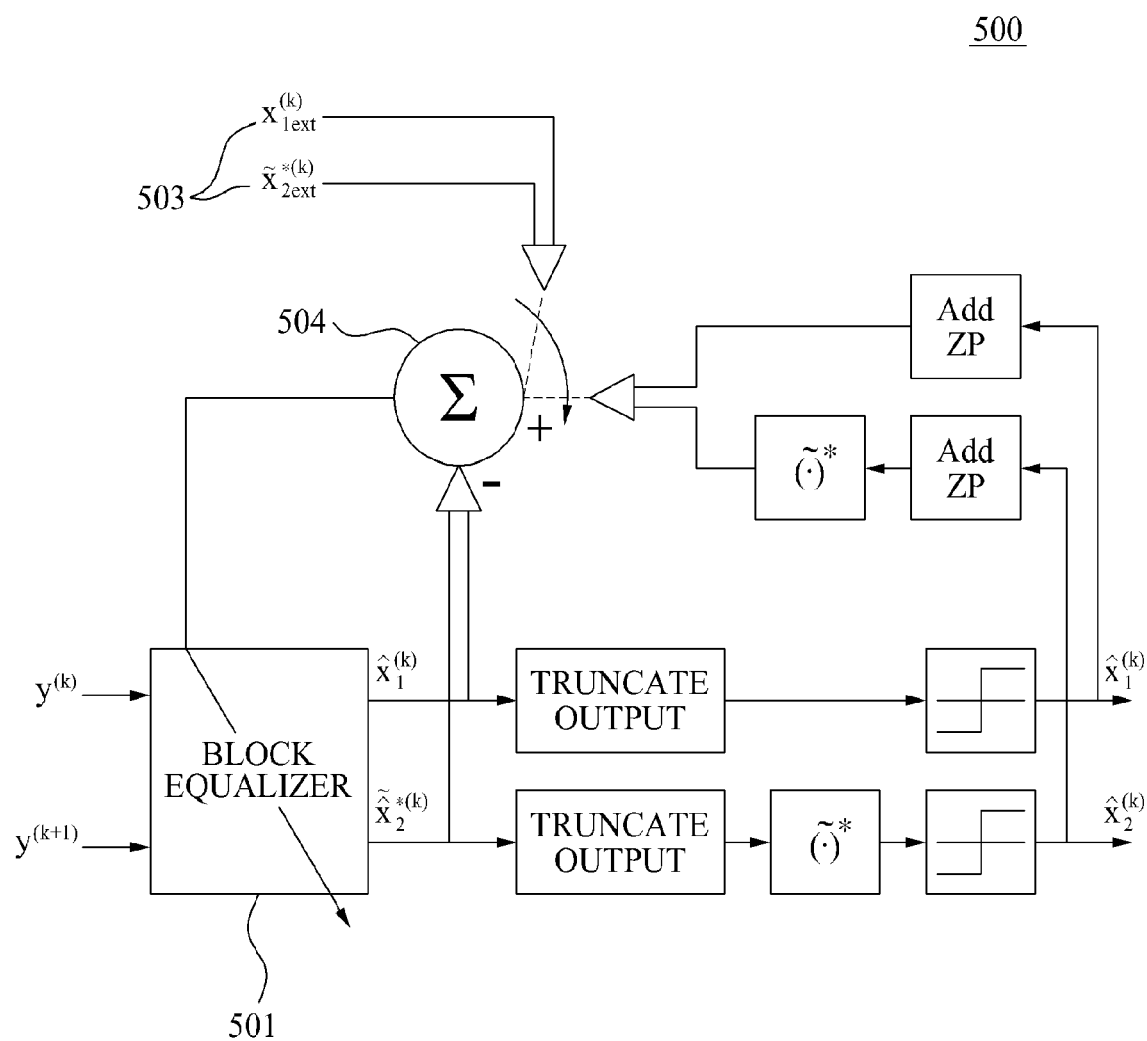
FIG. 5 is a block diagram illustrating a block Time Domain Equalizer (TDE) for a TR-STBC system according to an exemplary embodiment of the present invention.

FIG. 5 is a block diagram illustrating a block TDE for a TR-STBC system according to an exemplary embodiment of the present invention. A block TDE 500 compares an output of a block equalizer 501 and a desired response 503, and thereby generates an error vector. The error vector is used to update the equalizer tap weight according to either the block NLMS algorithm or the block RLS algorithm. The block equalizer 501 operates in training mode for the training blocks within a frame and switches to decision directed mode for the data blocks, as indicated by segment 504.

Figure 6:
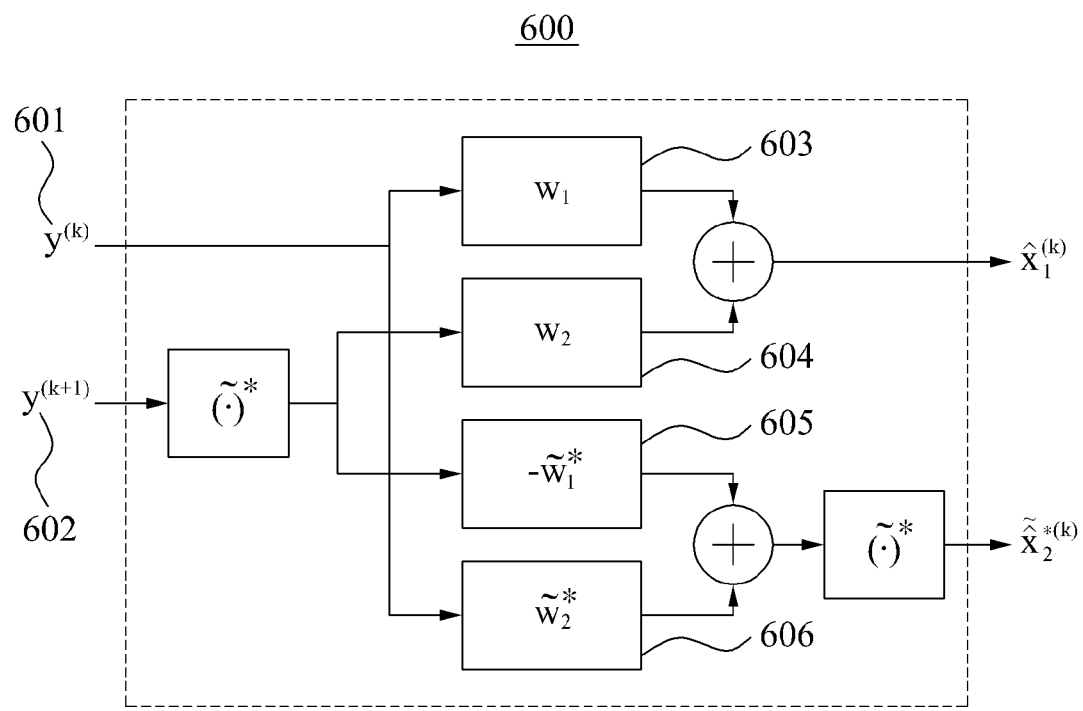
FIG. 6 is a block diagram illustrating an equivalent linear filter according to an exemplary embodiment of the present invention.

Here, in the block TDE 500, matrix U contains four convolution sub-matrices and the convolution operation is commutative, and an equivalent linear filter representation for the block equalizer 501 is shown in FIG. 6. FIG. 6 is a block diagram illustrating an equivalent linear filter according to an exemplary embodiment of the present invention. Specifically, the received block 601 is applied with equalizer tap weights 603 and 606 with respect to consecutively received blocks 601 and 602 inputted into the equivalent linear filter 600, and the received block 602 is applied with equalizer tap weights 604 and 605 with respect to the consecutively received blocks 601 and 602. In this instance, the received block 602 is time reversed and complex conjugated as indicated by reference segment 607. After that, the equalizer tap weights 604 and 605 are applied to the received block 602.

Outputs of the equalizer tap weights 603 and 604 are combined and thereby become one output of the block equalizer 501 as $\hat{x}_1^{(k)}$, and outputs of the equalizer tap weights 605 and 606 are combined and thereby become a remaining output of the block equalizer 501 as $\tilde{\hat{x}}^*_2{}^{(k)}$.

As described above, the block TDE which combines the decoder and the equalizer is used, thereby reducing the computational complexity, and facilitating the driving in real-time. The block TDE in which a decoder/equalizer length is independent of the block length is used, thereby reducing the computational complexity. Also, the training and data blocks are included in the same block through flexibility when using different length training and data blocks.

Figure 7B:
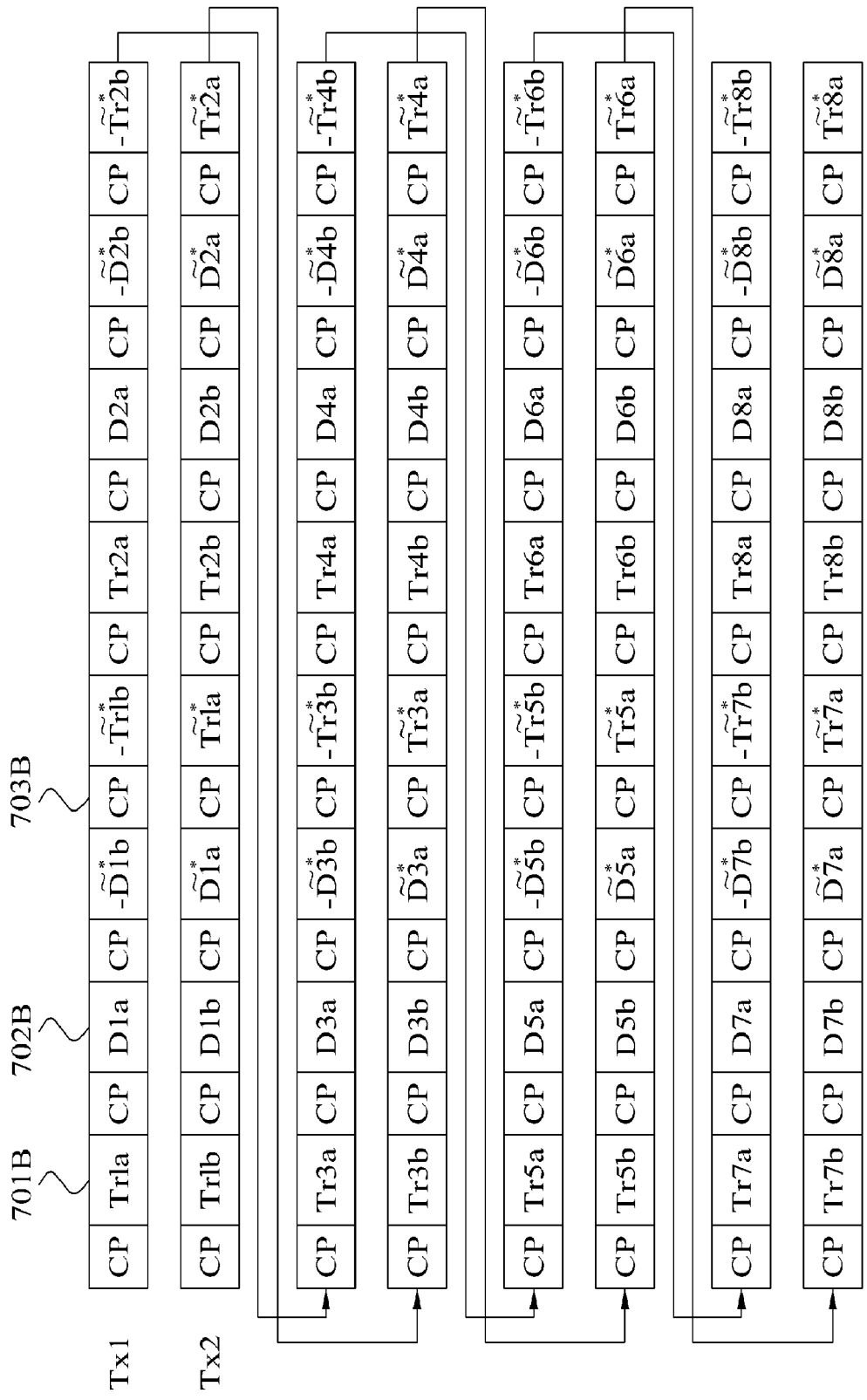

FIGS. 7A and 7B respectively illustrate a conventional frame structure and a frame structure according to another exemplary embodiment of the present invention.

The conventional frame structure of FIG. 7A is constrained such that a data block 701A has the same length as a training block 702A. For example, the FDE scheme requires same-length data and training blocks 701A and 702A. The frame structure of FIG. 7B according to the present exemplary embodiment of the invention can use different length training and data blocks 701B and 702B.

This frame structure of FIG. 7B makes it easier to mix the training and data blocks 701B and 702B evenly throughout the frame without affecting the bandwidth efficiency of the system. Also, the frame structure of FIG. 7B allows the system to perform better in fast time-varying channels than the frame structure of FIG. 7A.

Using this property of the block TDE scheme of the frame structure of FIG. 7B, the data block 702B is encapsulated by the training block 701B, and at the same time keeping the total overhead equal to the frame structure of FIG. 7A, thereby improving the performance. In the frame structure of FIG. 7B, each block is followed by a zero padding with a length of 3 symbols and each of the data and training blocks 702B and 701B has a length of 192 and 58 symbols, respectively.

As described above, a new frame structure where the training and data blocks are mixed in the same block is used, thereby increasing efficiency in channels having high mobility.

III. Simulation Results

Figure 8:
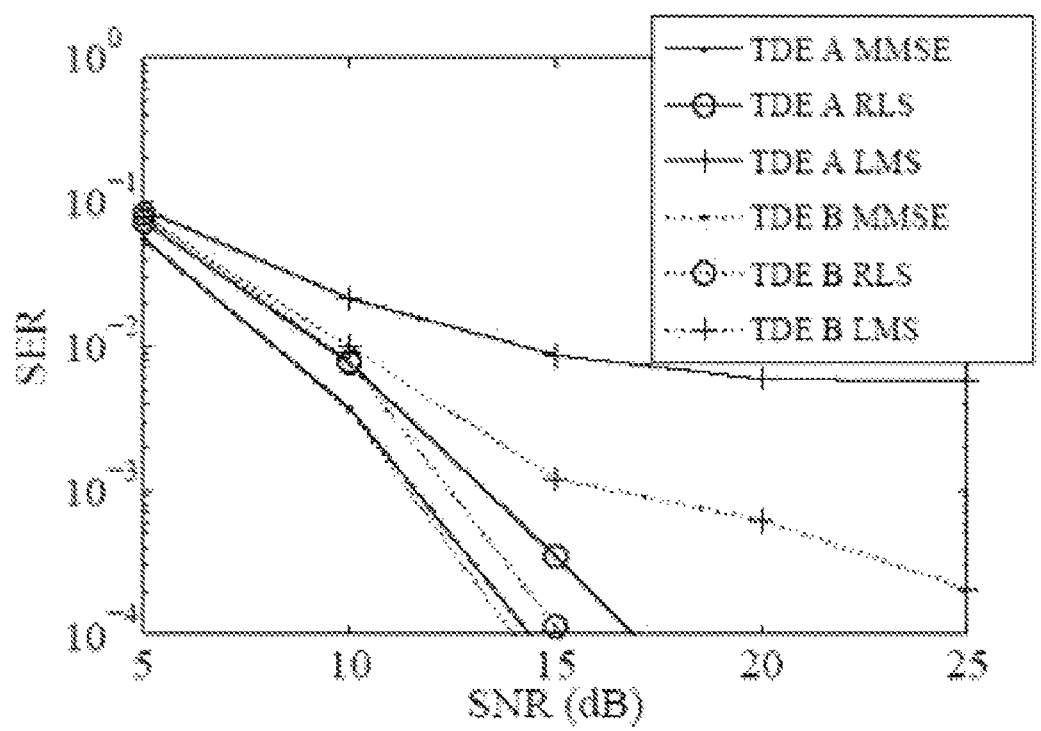
FIG. 8 is a graph illustrating simulation results of the frame structure A and the frame structure B.

FIG. 8 is a graph illustrating simulation results of the frame structure A and the frame structure B. FIG. 8 is a graph illustrating simulation results of the frame structures A and B implemented through MMSE, RLS, and LMS algorithms by using Doppler frequency of 10 Hz, which shows that the frame structure B has a better performance than the frame structure A. The frame structure B can be used in TDE for tracking fast time-varying channel condition.

Figure 9:
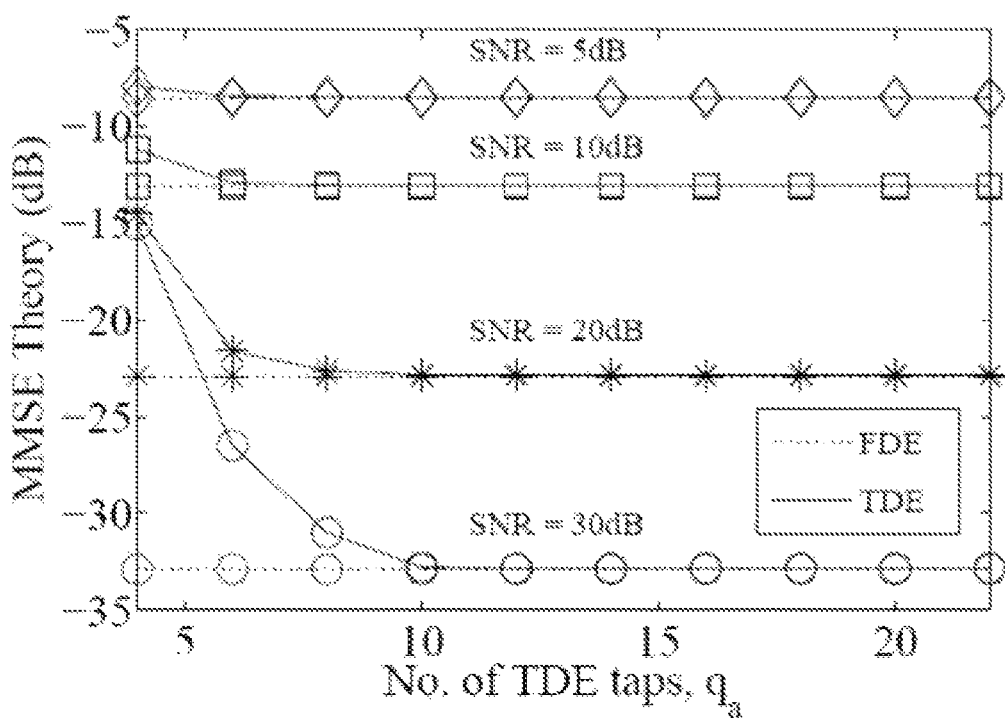
FIG. 9 is a graph illustrating simulation results comparing the performance of a FDE and a TDE by using a Minimum-Mean-Square-Error (MMSE)

FIG. 9 is a graph illustrating simulation results comparing the performance of a FDE and a TDE by using MMSE. Since the number of taps in the block equalizer is independent of the data block size, we use the simulation results of FIG. 9 to find a suitable length for the TDE operating over Typical Urban (TU) channel. FIG. 9 shows the MMSE as a function of the number of TDE taps for different Signal-to-Noise Ratio (SNR) values. FIG. 9 also shows the MMSE for the FDE.

Because the FDE is forced to have as many equalizer taps as the block size, the length of the FDE is kept constant at 256, that is, the block size used in the simulation. It is obvious that the optimum length of the TDE increases with the SNR and also is much less than the length of the FDE.

Figure 10:
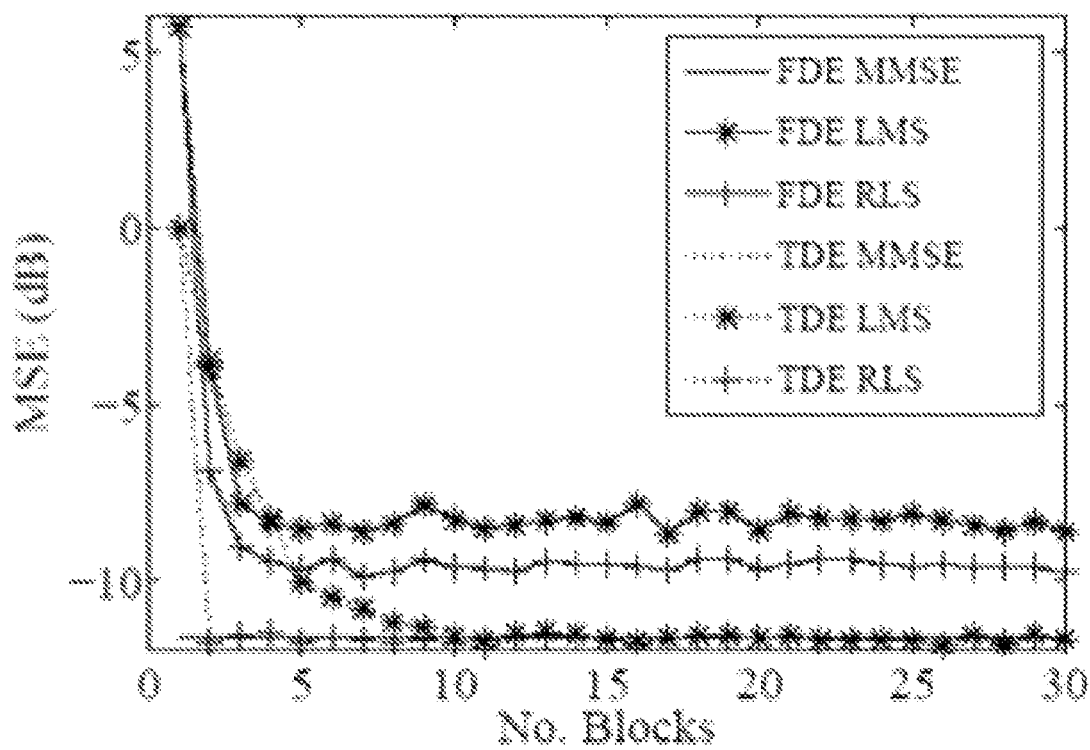
FIG. 10 is a graph illustrating simulation results comparing the dynamic convergence of a Mean-Square-Error between the TDE and the FDE.

FIG. 10 is a graph illustrating simulation results comparing the dynamic convergence of a Mean-Square-Error (MSE) between the TDE and the FDE.

FIG. 10 shows the convergence behaviors of the different TDE and FDE adaptive algorithms. FIG. 10 shows that the TDE running the RLS algorithm converges fastest to the MMSE solution.

The TU channel varies from sample to sample. The frame structure A described in FIG. 7A is used for the simulation results. In this instance, the frame structure A has a total of 16 blocks of which 4 blocks are used for training. Zero padding/cyclic prefix (ZP/CP) with a length of 3 symbols are inserted before and after each block. The training and data blocks have the same size of 256 blocks. Doppler frequencies of 10 Hz and 1 Hz are used for simulations, respectively.

Figure 11:
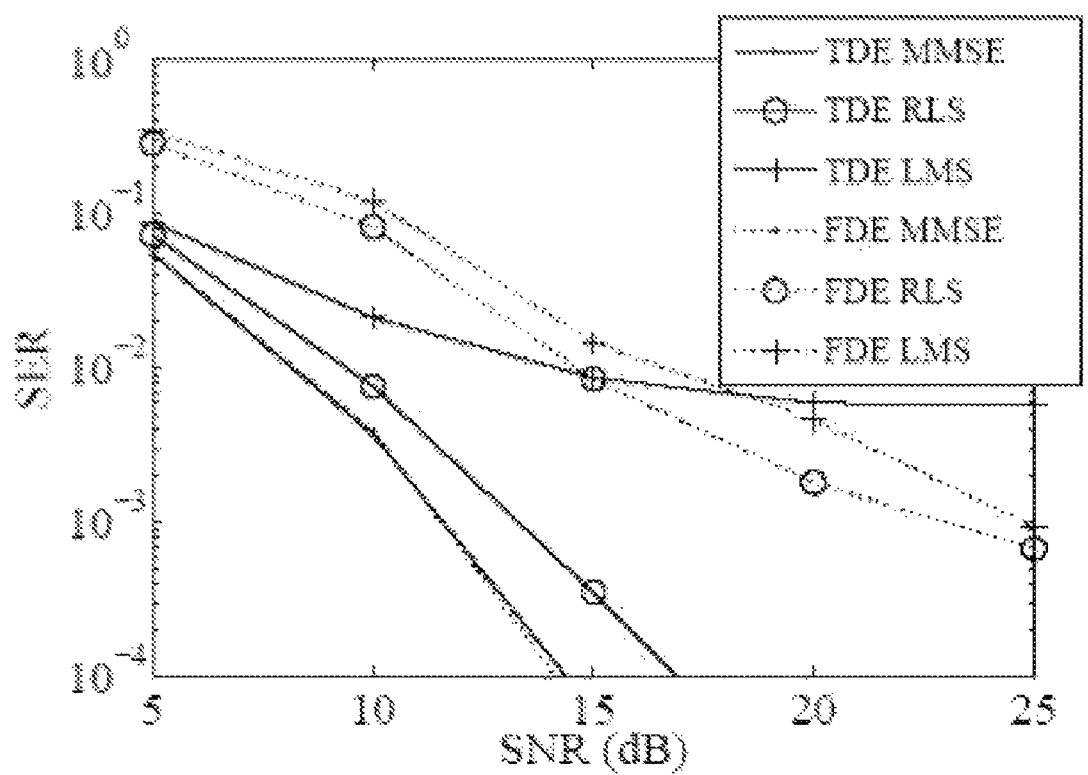
FIG. 11 is a graph illustrating simulation results comparing the TDE and the FDE with respect to a Doppler frequency of 10 Hz.
Figure 12:
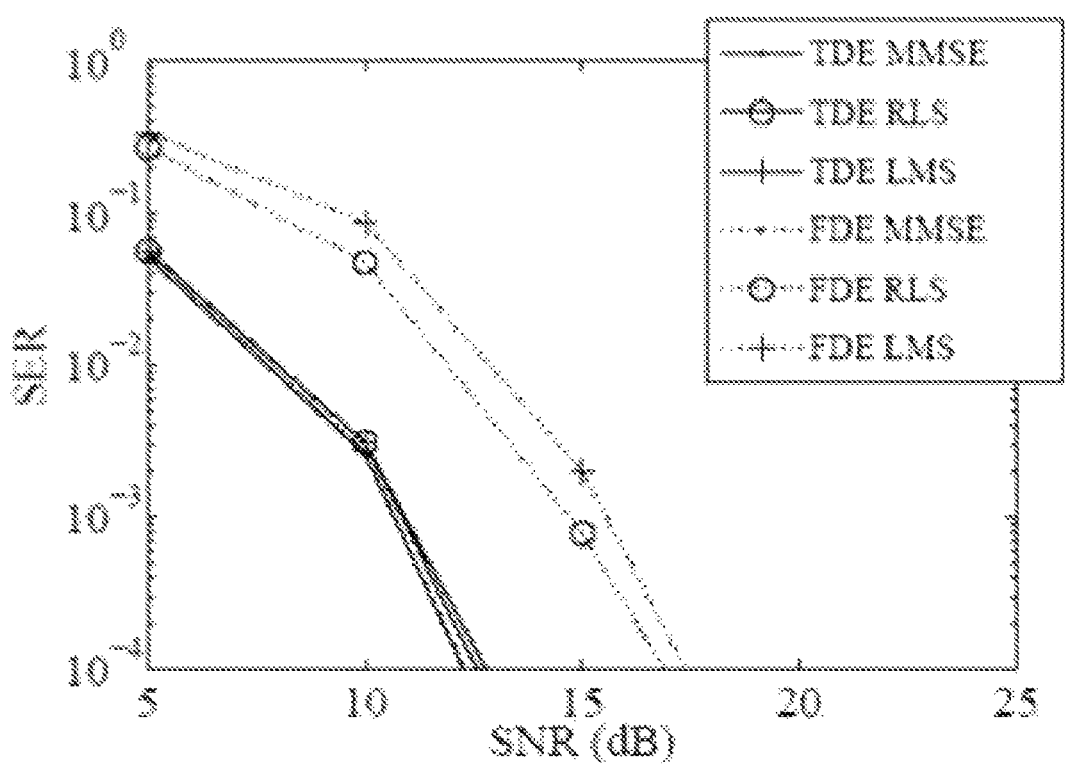
FIG. 12 is a graph illustrating simulation results comparing the TDE and the FDE with respect to a Doppler frequency of 1 Hz.

FIGS. 11 and 12 are graphs illustrating simulation results comparing the TDE and the FDE with respect to Doppler frequencies of 10 Hz and 1 Hz. It is obvious that the performances of both equalizers are better at the lower Doppler frequency. Also, TDE RLS outperforms the other equalization algorithms. Furthermore, TDE LMS performs better than the FDE adaptive algorithms at lower SNRs.

The operation method according to the present exemplary embodiment may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer readable media include magnetic media such as hard disks, floppy disks, and magnetic tape; optical media such as CD ROM disks and DVD; magneto-optical media such as optical disks; and hardware devices that are specially configured to store and perform program instructions, such as read only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

As described above, according to the present invention, the block TDE which combines a decoder and an equalizer is used, thereby reducing the computational complexity, and facilitating the driving in real-time.

According to the present invention, a decoder/equalizer length is independent of the block length, thereby reducing the computational complexity, and in which the training and data blocks are included in the same block through flexibility in use of different length training and data blocks.

According to the present invention, a new frame structure where the training and data blocks are mixed in the same block is used, thereby increasing efficiency in channels having high mobility.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A block Time Domain Equalizer (TDE) for a Time Reversal-Space Time Block Code (TR-STBC) system, the block TDE comprising:
   a block equalizer which generates an output based on an equalizer tap weight with respect to two consecutively received blocks;
   an equalizer tap weight updating unit which generates an error vector based on the output and the equalizer tap weight and updates the equalizer tap weight using the error vector; and
   a signal processing unit which processes the output into a digital signal wherein zero padding is eliminated from the output.

2. The block TDE of claim 1, wherein the equalizer tap weight is $w_k$, and includes $w_1$ and $w_2$, which are respectively represented as $$\tilde{w}^*_1 = \text{conv}(w, h_1), \quad \text{[Equation 35]}$$

where w denotes an element of an equalizer matrix W, and $h_1$ denotes one of Channel Impulse Responses (CIRs) of two channels fixed in the consecutive received blocks; and $$w_2 = \text{conv}(w, h_2), \quad \text{[Equation 36]}$$

where $h_2$ denotes another one of the CIRs of the two channels.

3. The block TDE of claim 2, wherein the equalizer tap weight has a characteristic in that values before and after applying computation for time-reversal and complex conjugate are identical to each other, in which the complex conjugate is given by $$w_o = \tilde{w}^*_o, \text{ and} \quad \text{[Equation 37]}$$

the block equalizer generates the output by $$\begin{bmatrix} \hat{x}_1^{(k)} \\ \tilde{x}_2^{*(k)} \end{bmatrix} = \begin{bmatrix} Y^{(k)} & \tilde{Y}^{*(k+1)} \\ -Y^{(k+1)} & \tilde{Y}^{*(k)} \end{bmatrix} \begin{bmatrix} w_1 \\ w_2 \end{bmatrix} \triangleq U w_k, \quad \text{[Equation 38]}$$

where each of $\hat{x}_1^{(k)}$ and $\tilde{x}_2^{*(k)}$ denotes the outputs, and U is generated based on the received block.

4. The block TDE of claim 3, wherein $Y^{(k)}$ a k-th matrix which is generated by the same method as a method of generating an $Y^{(i)}$ matrix with respect to an i-th received block, which is given by $$Y^{(i)} = \begin{bmatrix} y^{(i)} & 0 & \cdots & 0 \\ 0 & y^{(i)} & \cdots & 0 \\ \vdots & \vdots & \ddots & \vdots \\ 0 & 0 & \cdots & y^{(i)} \end{bmatrix}, \quad \text{[Equation 39]}$$

where $Y^{(i)}$ has a dimension of $(N+2V+q-1) \times (q+V)$, and $y^{(i)}$ is the i-th received block which is generated by the same method as a method of calculating the k-th received block and a k+1-th received block, which are consecutively received and given by $$y^{(k)} = [y^{(k)}(0), \ldots, y^{(k)}(N+V-1)]^T$$

$$y^{(k+1)} = [y^{(k+1)}(0), \ldots, y^{(k+1)}(N+V-1)]^T, \quad \text{[Equation 40]}$$

where N denotes a length of the received block.

5. The block TDE of claim 1, wherein the equalizer tap weight updating unit compares the output with a desired response and thereby generates the error vector, which is given by $$e_k = \begin{bmatrix} x_{1ext}^{(k)} \\ \tilde{x}_{2ext}^{*(k)} \end{bmatrix} - \begin{bmatrix} \hat{x}_1^{(k)} \\ \tilde{x}_2^{*(k)} \end{bmatrix}, \quad \text{[Equation 41]}$$

where $e_k$ denotes the error vector, each of $\hat{x}_1^{(k)}$ and $\tilde{x}_2^{*(k)}$ denotes the outputs, and each of $x_{1ext}^{(k)}$ and $\tilde{x}_{2ext}^{*(k)}$ denotes the desired responses, and the desired responses are respectively given by $$x_{1ext}^{(k)} = [0_{1 \times [(2V+q-1)/2]}, (x_1^{(k)})^T, 0_{1 \times [(2V+q-1)/2]}]^T$$

$$\tilde{x}_{2ext}^{*(k)} = [0_{1 \times [(2V+q-1)/2]}, (\tilde{x}_2^{*(k)})^T, 0_{1 \times [(2V+q-1)/2]}]^T. \quad \text{[Equation 42]}$$

6. The block TDE of claim 5, wherein the equalizer tap weight updating unit repeatedly updates the equalizer tap weight according to the received block using Equation 43, which is associated with a block Normalized Least Mean Square (NLMS) algorithm, and is given by $$P_k(m,m) = \mu/|U(m,:)|^2, \text{ for } m=1,\ldots,2q_a$$

$$w_{k+2} = w_k + P_k U^T e^*_k, \quad \text{[Equation 43]}$$

where $\mu$ denotes a predetermined positive number, and U is generated based on the received block.

7. The block TDE of claim 6, wherein an initialization condition with respect to updating of the equalizer tap weight is represented as $$w_0 = 0_{2q_a \times 1}$$

$$P_0 = 0_{2q_a \times 2q_a}, \quad \text{[Equation 44]}$$

where q denotes a number of taps associated with the block TDE, $q_a$ denotes a sum of q and V, and V denotes a number of zero paddings included with the received block in a frame.

8. The block TDE of claim 6, wherein the equalizer tap weight updating unit comprises:
   a truncate block which eliminates the zero padding from the output; and
   a mode switch which switches a training mode for a training block and a direct mode for a data block.

9. The block TDE of claim 5, wherein the equalizer tap weight updating unit repeatedly updates the equalizer tap weight according to the received block using Equation 45, which is associated with a block Recursive Least Square (RLS) algorithm, and is given by $$\Phi_{k+2} = \lambda \Phi_k + U^H U$$

$$w_{k+2} = w_k + \Phi_k^{-1} U^T e^*_k \quad \text{[Equation 45]}$$

where $\lambda$ denotes a relatively positive number which is predetermined and close to 1, and U is generated based on the received block.

10. The block TDE of claim 9, wherein an initialization condition with respect to updating of the equalizer tap weight is represented as $$w_0 = 0_{2q_a \times 1}$$

$$\Phi_0 = I_{2q_a \times 2q_a}, \quad \text{[Equation 46]}$$

where q denotes a number of taps associated with the block TDE, $q_a$ denotes a sum of q and V, and V denotes a number of zero paddings included with the received block in a frame.

11. The block TDE of claim 9, wherein the equalizer tap weight updating unit comprises:
   a truncate block which eliminates the zero padding from the output; and
   a mode switch which switches a training mode for a training block and a direct mode for a data block.

12. A method for performing a block NLMS algorithm in a block TDE for a TR-STBC system, the method comprising:
   initializing an equalizer tap weight;
   generating an error vector for a block equalizer wherein the block equalizer is included in the block TDE;
   updating the equalizer tap weight based on the error vector, the equalizer tap weight, and an output of the block equalizer; and
   repeatedly performing the generating and the updating according to a received block wherein the received block is inputted into the block TDE.

13. The method of claim 12, wherein the equalizer tap weight is $w_k$, and includes $w_1$ and $w_2$, which are respectively represented as $$\tilde{w}^*_1 = \text{conv}(w, h_1), \quad \text{[Equation 47]}$$

where w denotes an element of an equalizer matrix W, and $h_1$ denotes one of CIRs of two channels fixed in the consecutive received blocks, and $$w_2 = \text{conv}(w, h_2), \quad \text{[Equation 48]}$$

where $h_2$ denotes another one of the CIRs of the two channels; and
the initializing initializes the equalizer tap weight by $$w_0 = 0_{2q_a \times 1}$$

$$P_0 = 0_{2q_a \times 2q_a}, \quad \text{[Equation 49]}$$

where q denotes a number of taps associated with the block TDE, $q_a$ denotes a sum of q and V, and V denotes a number of zero paddings included with the received block in a frame.

14. The method of claim 12, wherein the generating compares the output with a desired response associated with the block TDE and thereby generates the error vector, in which the vector is given by $$e_k = \begin{bmatrix} x^{(k)}_{1ext} \\ \tilde{x}^{*(k)}_{2ext} \end{bmatrix} - \begin{bmatrix} \hat{x}^{(k)}_1 \\ \hat{x}^{*(k)}_2 \end{bmatrix}, \quad \text{[Equation 50]}$$

where each of $\hat{x}_1^{(k)}$ and $\tilde{x}_2^{*(k)}$ denotes the outputs, and each of $x_{1ext}^{(k)}$ and $\tilde{x}^*_{2ext}^{(k)}$ denotes the desired responses, and the desired responses are generated in the block TDE, and given by $$x_{1ext}^{(k)} = [0_{1 \times [(2V+q-1)/2]}, (x_1^{(k)})^T, 0_{1 \times ((2V+q-1)/2)}]^T$$

$$\tilde{x}^*_{2ext}^{(k)} = [0_{1 \times [(2V+q-1)/2]}, (\tilde{x}^*_2^{(k)})^T, 0_{1 \times ((2V+q-1)/2)}]^T. \quad \text{[Equation 51]}$$

15. The method of claim 12, wherein the updating updates the tap weight vector by using a conjugate complex number of the error vector, the equalizer tap weight, and the output, in which the tap weight vector is updated using $$P_k(m,m) = \mu / |U(m,:)|^2, \text{ for } m=1, \ldots, 2q_a$$

$$w_{k+2} = w_k + P_k U^T e^*_k \quad \text{[Equation 52]}$$

where $e^*_k$ denotes the conjugate complex number and $\mu$ denotes a predetermined positive number.

16. A method for performing a block RLS algorithm in a block TDE for a TR-STBC system, the method comprising:
   initializing an equalizer tap weight;
   generating an error vector for a block equalizer wherein the block equalizer is included in the block TDE;
   updating the equalizer tap weight based on the error vector, the equalizer tap weight, and an output of the block equalizer; and
   repeatedly performing the generating and the updating according to a received block wherein the received block is input into the block TDE.

17. The method of claim 16, wherein the equalizer tap weight is $w_k$, and includes $w_1$ and $w_2$, which are respectively represented as $$\tilde{w}^*_1 = \text{conv}(w, h_1), \quad \text{[Equation 53]}$$

where w denotes an element of an equalizer matrix W, and $h_1$ denotes one of CIRs of two channels fixed in the consecutive received blocks, and $$w_2 = \text{conv}(w, h_2), \quad \text{[Equation 54]}$$

where $h_2$ denotes another one of the CIRs of the two channels; and
the initializing initializes the equalizer tap weight by $$w_0 = 0_{2q_a \times 1}$$

$$\Phi_0 = I_{2q_a \times 2q_a}, \quad \text{[Equation 55]}$$

where q denotes a number of taps associated with the block TDE, $q_a$ denotes a sum of q and V, and V denotes a number of zero paddings included with the received block in a frame.

18. The method of claim 16, wherein the generating compares the output with a desired response associated with the block TDE and thereby generates the error vector, in which the error vector is given by $$e_k = \begin{bmatrix} x_{1ext}^{(k)} \\ \tilde{x}_{2ext}^{*(k)} \end{bmatrix} - \begin{bmatrix} \hat{x}_1^{(k)} \\ \hat{\tilde{x}}_2^{*(k)} \end{bmatrix},$$ [Equation 56]

where each of $\hat{x}^*{}_1^{(k)}$ and $\hat{\tilde{x}}_2^{*(k)}$ denotes the outputs, and each of $x^*{}_{1ext}^{(k)}$ and $\tilde{x}^*{}_{2ext}^{(k)}$ denotes the desired responses, and the desired responses are respectively generated in the block TDE and given by $$x_{1ext}^{(k)} = [0_{1 \times [(2V+q-1)/2]}, (x_1^{(k)})^T, 0_{1 \times ((2V+q-1)/2)}]^T$$

$$\tilde{x}^*{}_{2ext}^{(k)} = [0_{1 \times [(2V+q-1)/2]}, (\tilde{x}^*{}_2^{(k)})^T, 0_{1 \times ((2V+q-1)/2)}]^T.$$ [Equation 57]

19. The method of claim 16, wherein the updating updates the tap weight vector by using a conjugate complex number of the error vector, the equalizer tap weight, and the output, which is given by $$\Phi_{k+2} = \lambda \Phi_k + U^H U$$

$$w_{k+2} = w_k + w_k^{-1} U^T e^*_k$$ [Equation 58]

where $e^*_k$ denotes the conjugate complex number, $\lambda$ denotes a positive number which is predetermined and close to 1, and U is generated based on the received block.

20. A computer-readable recording medium storing a program that implements a method which performs a block NLMS algorithm in a block TDE for a TR-STBC system, the method comprising:

initializing an equalizer tap weight;

generating an error vector for a block equalizer wherein the block equalizer is included in the block TDE;

updating the equalizer tap weight based on the error vector, the equalizer tap weight, and an output of the block equalizer; and repeatedly performing the generating and the updating according to a received block wherein the received block is inputted into the block TDE.

* * * * *